Feb. 7, 1939.    R. A. GEISEL    2,145,925
RELIEF VALVE
Filed July 7, 1936
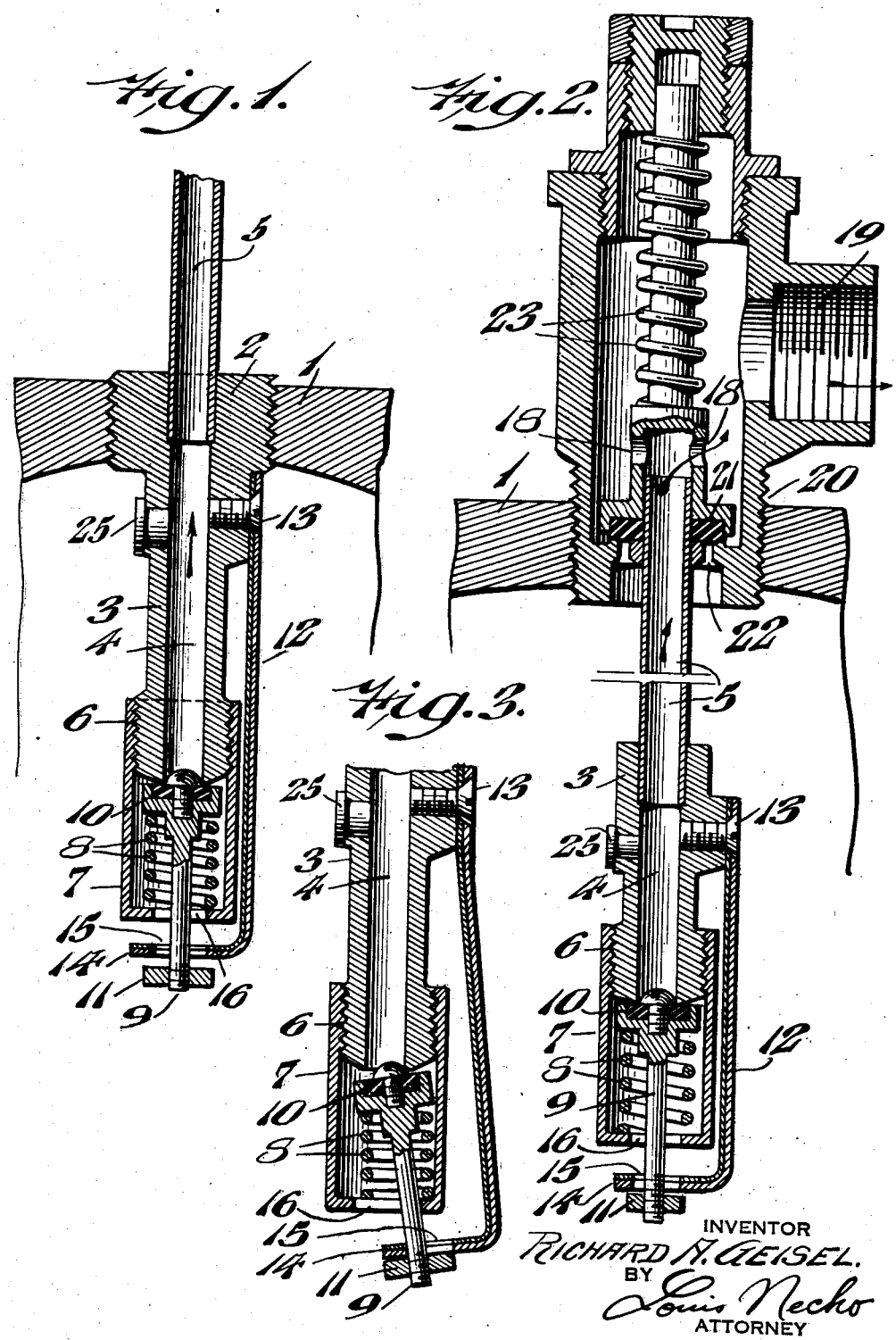
INVENTOR
RICHARD A. GEISEL.
BY
Louis Necho
ATTORNEY Patented Feb. 7, 1939

2,145,925

UNITED STATES PATENT OFFICE 2,145,925

RELIEF VALVE

Richard A. Geisel, Philadelphia, Pa.

Application July 7, 1936, Serial No. 89,305

2 Claims. (Cl. 137—139)

My invention relates to a new and useful relief valve and it relates more particularly to a thermostatic relief valve wherein the temperature of the water serves to open an otherwise normally closed outlet to permit the overflow of the excess hot water, thereby eliminating all danger of explosion.

My invention further relates to a relief valve of this character which is an extremely simple construction and which is capable of being used alone or in conjunction with the pressure operated relief valves without any interference in the structure or operation of the latter.

My invention still further relates to a thermostatic relief valve of this character in which the principle of leverage is employed to increase the sensitivity of the device as well as to enable it to be operated by a relatively small force under relatively great tension and hydraulic pressure.

My invention still further relates to a thermostatic relief valve which embodies novel means for permitting a wide range of adjustment without the use of any positive additional or extraneous means of mechanism for effecting such adjustment.

In the accompanying drawing:

Figure 1 represents a fragmentary cross sectional view of a thermostatic relief valve embodying my invention, shown applied to a hot water tank and utilized alone.

Figure 2 represents the same view of the thermotatic relief valve except that it is shown applied to a tank and used in conjunction with a pressure relief valve.

Figure 3 represents a fragmentary view similar to Figure 1 showing the valve in its open position.

Referring to the drawing in which like reference characters indicate like parts, I designates the bottom, side and top walls of any hot water tank to which is threaded, as at 2, the outer end of a shank 3 which is hollow to provide the conduit 4 in which is fitted the extension 5 which leads to any suitable drain. To the other end of the shank 3 is threaded at 6, or otherwise suitably secured, the casing 7 in which is positioned the spring 8 which is wound around the stem 9 and which serves to press the valve head 10 against the adjacent end of the conduit 4 to keep the latter closed. The stem 9 is provided with any suitable retaining nut 11. 12 designates a bimetallic thermostatic element secured to the shank 3, as at 13, and deflected to form the leg 14 which is provided with the opening 15 which registers with the opening 16 in the casing 7, it being noted that the stem 9 of the valve 10 passes through the openings 15 and 16.

In Fig. 1 the valve is shown in its closed position in which the thermostatic element 12 has not been warped or deflected by the action of heat, and in which the valve 10 completely closes the conduit 4. In Fig. 3 I have shown a thermostatic element as deflected by the heat of the water and, as shown in Fig. 3, the valve stem 9 is also tilted, thus tilting the valve head 10 with respect to its seat and permitting the water to flow in the direction of the arrow through the conduit 4.

In addition to the fact that the nature of the thermostatic element 12 can be varied to render it operative at certain predetermined temperatures, I have also provided the novel adjustment feature in the form of the opening 15 which serves to determine the point at which the deflection of the thermostatic element 12 will be effectively transmitted to the valve stem 9. Thus, if the opening 15 is very small so that it constitutes a tight, or near tight, fit around the valve stem 9, a relatively slight deflection of the thermostatic element 12 will affect and deflect the valve stem 9 and the valve 10 off its seat, and conversely, if the opening 15 is relatively large, as it is shown in Fig. 1, the thermostatic element 12 will have to be deflected considerably before its warped position will begin to exert a deflecting action on the valve stem 9.

In order to increase the sensitiveness of my device, I have resorted to the principle of leverage by means of which the deflection or warping of the thermostatic element is exaggerated, and I also utilize the principle of leverage for increasing the force, or effectiveness, of the deflection of the thermostatic element thus enabling me to use a relatively small and weak thermostatic element to work effectively under conditions of relatively great tension and hydraulic pressure. Thus, by fulcruming the thermostatic element 12 near its end at 13, it follows that the deflection that the leg 14 of the thermostatic element undergoes would be on an arc with the length of the thermostatic element 12 as a radius so that a small deflection at a point near the fastening element 13, even if the deflection of the rest of the thermostatic element itself is discounted, would result in a relatively large movement of the leg portion 14 with respect to the longitudinal axis of the conduit 4 thus tilting the valve stem 9 with it. Similarly, by exerting the deflection against the stem 9 near the end thereof, or away from the valve head 10 against which the spring 8 presses, the principle of leverage is employed to effect the tilting of the valve head 10 off its seat with a relatively small amount of force. In Fig. 2 I have shown the device applied to a tank 1, but instead of having the conduit extension 5 leading directly to a drain, this conduit leads into a pressure relief valve of a conventional construction and discharges through the ports 18 and out through the discharge nozzle 19 to any suitable drain. In this construction the pressure relief valve is threaded, as at 20, into the wall 1 of the tank and the pressure of the water in the tank reaches the spring pressed valve 21 through the port 22 so that, when the pressure within the water tank 1 is greater than the pressure of the spring 23, the valve 21 will be lifted to permit some of the water in the tank 1 to escape through the outlet 19. The entire device, as shown in Fig. 1, and as shown in Fig. 2, may be applied to the water in the tank or one of the pipes carrying the hot water from the tank up to the building could be tapped and the device, as shown in Fig. 1 or in Fig. 2, applied to the pipe itself for relieving both according to a predetermined temperature and a predetermined pressure, or either.

If desired, I may, as an additional safeguard embody in a suitable part of the device between the valve 10 and the wall 1 of the tank a fusible plug 25 made of metal or an alloy that has a relatively low melting point so that, in the event of the failure of the mechanism to function after years of use, the plug 25 will melt and thus establish an unobstructed passage for the water in the tank regardless of its temperature, thus not only safeguarding against exposure, but giving notice that the thermostatic relief valve is out of order. In actual practice I have found that the mechanism is entirely reliable and has an indefinite life of service, so that the addition of the plug 25 constitutes provision against remote contingencies only. The temperature at which the plug 25 will melt could be set at any desired limit, depending on the nature, capacity and use of the tank to which it is applied. Thus, for hot water tanks for home use the plug 25 is made of any desired material that will melt at slightly over 200° F., while for industrial use, where greater pressures and temperatures are needed, the temperature at which the plug 25 melts can be correspondingly raised.

Having thus described my invention, what I claim as new and desire to secure by Letters Patent is:

1. A relief valve comprising a waste outlet tube adapted to be inserted into a water heater or the like, a spring pressed valve having a stem adapted normally to close the inner end of said outlet tube, a casing surrounding said valve and having an opening therein through which the end of said stem projects and a thermostatic element for actuating said valve extending parallel with said outlet tube and fulcrumed thereto at a point relatively distant from said valve, there being an opening through the free end of said thermostatic element cooperating with the end of said valve stem whereby the relative sizes of said opening and stem predetermine the temperature at which the relief valve will operate.

2. A relief valve comprising a conduit adapted to extend within a hot water tank and to project out therefrom through a wall of said tank, a valve seat formed within said conduit, a tiltably mounted valve having a stem normally engaging said valve seat and closing said conduit, and a thermostatic element carried by said conduit and having its end deflected into alignment with the stem of said valve, there being an opening in the deflected end of said thermostatic element through which the stem of said valve projects, said opening being larger in diameter than said stem to provide play therebetween, whereby, when said thermostatic element is deflected a sufficient amount, said valve is tilted away from said valve seat, and whereby the conduit is opened.

RICHARD A. GEISEL.